United States Patent [19]

Glass et al.

[11] Patent Number: 4,822,621

[45] Date of Patent: Apr. 18, 1989

[54] METHOD AND PRODUCT FOR INCREASED ASPARTAME STABILITY IN CHEWING GUM

[75] Inventors: Michael Glass, Fairlawn; Joseph Hoholick, Hopatcong, both of N.J.; Eva K. Malinowski, Franklin Square, N.Y.; Zdravko Dokuzovic, Mississauga; Zoltan Bodor, Pickering, both of Canada

[73] Assignee: Warner-Lambert Company, Morris Plains, N.J.

[21] Appl. No.: 79,849

[22] Filed: Jul. 30, 1987

[51] Int. Cl.$^4$ .............................................. A23G 3/30
[52] U.S. Cl. ....................................... 426/5; 426/548; 426/804
[58] Field of Search ........................................ 426/3–6, 426/548, 804, 658

[56] References Cited

U.S. PATENT DOCUMENTS

| | | | |
|---|---|---|---|
| 810,210 | 1/1906 | Laws | 426/5 |
| 1,193,423 | 8/1916 | Pryor | 426/5 |
| 1,771,981 | 7/1930 | Mustin | 426/5 |
| 1,771,982 | 7/1930 | Mustin | 426/5 |
| 2,304,246 | 12/1942 | Ekert | 426/5 |
| 3,928,633 | 12/1975 | Shoaf et al. | 426/96 |
| 3,956,507 | 5/1976 | Shoaf et al. | 426/96 |
| 3,962,463 | 6/1976 | Witzel | 426/5 |
| 3,969,513 | 7/1976 | Canonne | 426/5 |
| 4,004,039 | 1/1977 | Shoaf et al. | 426/548 |
| 4,122,195 | 10/1978 | Bahoshy et al. | 426/3 |
| 4,139,639 | 2/1979 | Bahoshy et al. | 426/3 |
| 4,246,286 | 1/1981 | Klose et al. | 426/3 |
| 4,352,824 | 10/1982 | Puglia et al. | 426/5 |
| 4,374,858 | 2/1983 | Glass et al. | 426/5 |
| 4,384,004 | 5/1983 | Cea et al. | 426/3 |
| 4,485,118 | 11/1984 | Carroll et al. | 426/5 |
| 4,556,565 | 12/1985 | Arima et al. | 426/3 |
| 4,590,075 | 5/1986 | Wei et al. | 426/5 |
| 4,656,039 | 4/1976 | Weiss et al. | 426/5 |

FOREIGN PATENT DOCUMENTS 2177587A 1/1987 United Kingdom.

*Primary Examiner*—Jeanette Hunter
*Attorney, Agent, or Firm*—Gary M. Nath

[57] ABSTRACT

A stabilized chewing gum product containing an L-aspartic acid derived sweetener in its free form and method for manufacture thereof are disclosed. The chewing gum product includes at least two portions, one of which includes, in its free form, Aspartame (APM) as an artificial, low calorie sweetener. Also included in the APM-containing portion can be an organic acid which will maintain the pH of the portion at a level conducive to maintaining the stability of APM. A second portion can include flavoring agents, and optionally, at least one moisture-containing agent. The portions are arranged in surface-to-surface relationship whereby contact between the APM and the flavorings and/or moisture-containing agent of the second portion is substantially reduced. The stability of APM and, consequently, of the chewing gum product is substantially increased.

37 Claims, 1 Drawing Sheet

U.S. Patent  Apr. 18, 1989  4,822,621
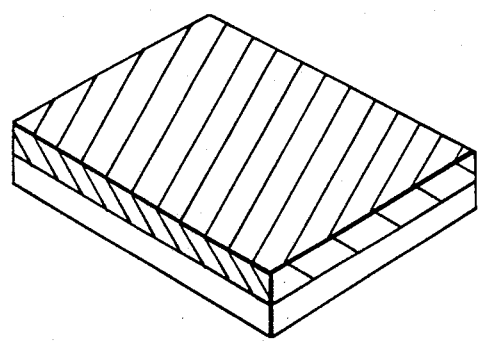
Fig.1
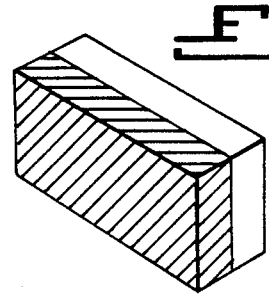
Fig.2
Fig.3
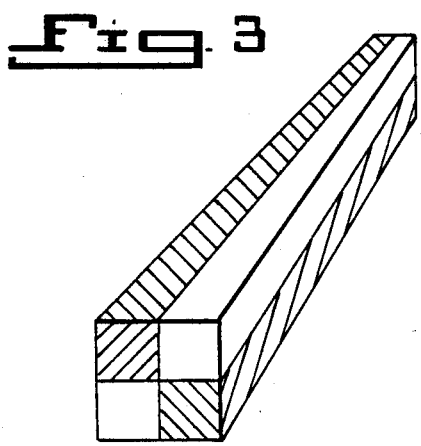
Fig.4
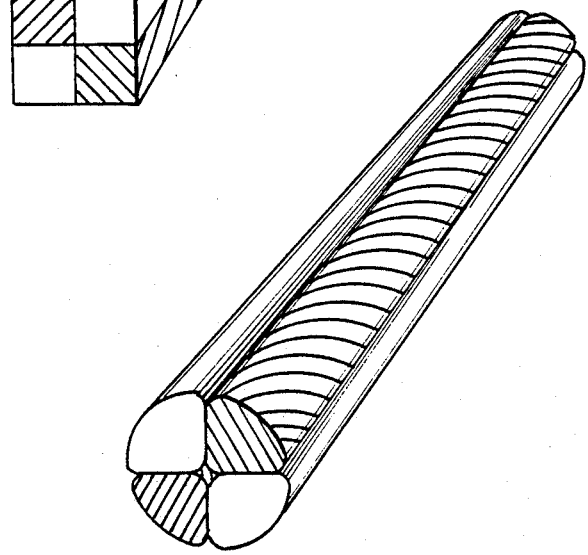
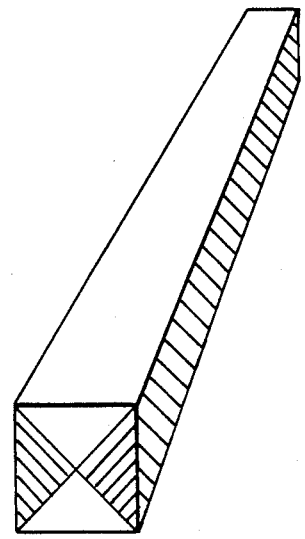
Fig.5

METHOD AND PRODUCT FOR INCREASED ASPARTAME STABILITY IN CHEWING GUM

This invention relates to chewing gum products with improved stability toward L-appartic acid derived sweeteners. More particularly, this invention relates to a gum product of overall increased stability due to coextrusion or colayering the sweetener-containing composition(s).

In recent years, Aspartame has been employed as an artificial, low calorie sweetener in chewing gum compositions. However, chewing gum compositions employing Aspartame have characteristically exhibited impractical levels of instability. Instability may manifest itself in a number of different ways, such as by staling and by noticeable changes in texture, taste, color and the like. The instability of chewing gum compositions containing Aspartame is primarily attributable to the instability of Aspartame itself in heterogeneous environments which include, among other things, flavorings, especially aldehyde-based flavorings, and moisture components. Thus, one problem encountered by those skilled in the art of sugarless chewing gum compositions that employ Aspartame as a sweetener is the degradation of Aspartame due to the presence of aldehydes, which are used as flavorings, moisture components, and pH levels at which Aspartame exhibits instability, such as above about 4.5. This instability and other poblems associated with Aspartame are due to the wettability of the Aspartame crystal, as well as to its morphological configuration. More specifically, hydrolysis of Aspartame results in the formation of Schiff Bases. Also, Aspartame decomposes to phenylalanine and diketopiperazine (DKP) in the presence of aldehydes.

Numerous attempts in the art to stabilize Aspartame in chewing gum compositions have been disclosed. One attempt to stabilize Aspartame is by encapsulating it with a variety of formulated coatings For instance, U.S. Pat. No. 4,590,075 to Wei, et al. discloses a flavor and sweetener delivery system comprising sweetening agents, one of which is Aspartame, encapsulated in a matrix comprising at least one elastomer; at least one elastomer solvent; at least one wax system; an excipient selected from the group consisting of carbohydrates, polyhydric alcohols and mixtures thereof; and, optionally, spherical particles having microporous channels.

U.S. Pat. No. 4,556,565 to Arima, et al. discloses an encapsulated sweetener composition of L-aspartyl-L-phenylalanine methyl ester (APM) employed in a chewing gum base to form a chewing gum composition. The chewing gum composition also includes hydrogenated starch hydrolysate and/or hydrogenated maltose and a sugar alcohol wherein the chewing gum base excludes calcium carbonate and talc, and includes microcrystalline cellulose in lieu thereof.

U.S. Pat. No. 4,485,118 to Carroll, et al. discloses a gum composition and method for making same, which contains a sequentially releasable plural flavor system comprised of different flavors. One of the flavors is encapsulated within a water-insoluble coating. A separate liquid flavor is introduced individually and is available for immediate release.

U.S. Pat. No. 4,384,004 to Cea, et al. discloses the encapsulation of the artificial sweetener L-aspartyl-L-phenylalanine methyl ester (APM) within a coating material including cellulose ethers, cellulose esters, certain vinyl polymers, gelatin and zein, in a ratio of coating material to APM of 1:1 or less. The stabilized APM is particularly suited for incorporation into chewing gum formulations.

U.S. Pat. No. 4,139,639 to Bahoshy, et al. discloses the fixing or encapsulating of L-aspartyl-L-phenylalanine methyl ester (APM) in order to retard and/or prevent the conversion of APM to diketopiperazine (DKP), under certain moisture, temperature and pH conditions which can effect a chewing gum system.

U.S. Pat. Nos. 4,004,039, 3,956,507 and 3,928,633, each to Shoof, et al., disclose a sweetening composition wherein APM is discretely dispersed throughout a matrix created by melting a fuseable mass and subdividing it to encapsulate the APM therein. The sweetening composition of the disclosures are applicable to food mixes and patentees are not particularly concerned with chewing gum compositions.

U.S. Pat. No. 3,962,463 to Witzel discloses a chewing gum having an acceptable flavor but with a substantially reduced content of flavoring ingredients, obtained by impregnating or depositing solid flavor particles, such as microencapsulated flavor particles or flavors sorbed on an edible substrate, on the surface of the gum.

While the encapsulation or coating technique of stabilizing Aspartame has been successful to a limited degree, it does suffer a variety of disadvantages, since flavor aldehydes still penetrate the encapsulate and destabilize Aspartame. Aspartame is known to be rod-like, needle-like or dendritic in shape. As a result, it is very difficult to coat Aspartame using ordinary mixing or spray coating techniques. To be effective as protective barriers, coatings must be able to wet and adhere to the crystalline surface, including the needle-like tips and other shape variations of the Aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific products.

It has been discovered that simple mixing of known materials, such as fats, with certain other core materials, such as Aspartame, does not provide adequate protection to keep the core material in a stabilized state. Fats have not been found to provide adequate coating materials, nor have such coating materials as starch and certain other materials such as waxes. Many of these materials require solvents and moisture for application, which have adverse effects on the stability of hydrophilic instable materials such as Aspartame. For example, simple mixing of Aspartame in liquid mixtures of traditional coating materials, e.g., fat and lecithin, has resulted in poor wetting, spotty coating and inadequate protection against moisture and chemicals. The result is degradation of the Aspartame upon exposure to these conditions. Changes in pH and temperature catalyze these degradative conditions.

Other shortcomings associated with encapsulates is that the gum compositions in which they are employed are initially organoleptically unsatisfying, since encapsulates shield the sweetener, i.e., Aspartame, from the consumer's tongue.

Other attempts at stabilizing Aspartame in chewing gum compositions are disclosed in U.S. Pat. No.

4,374,858 to Glass, et al. wherein the sweetness stability of an Aspartame sweetened chewing gum is enhanced by coating the Aspartame onto the surface of the chewing gum piece; U.S. Pat. No. 4,246,286 to Klose, et al. discloses a sweetened chewing gum composition which contains L-aspartyl-L-phenylalanine methyl ester (APM) in amounts up to 1.5% by weight of the total product. The reported improvement comprises a gum which has a pH of between 5.0 and 7.0 so that the degradation of APM to diketopiperazine is minimized and the storage stability of the gum is increased; and U.S. Pat. No. 4,122,195 to Bahoshy, et al. discloses a product and process in which L-aspartyl-L-phenylalanine methyl ester is fixed in the reaction product of a compound containing a polyvalent metallic ion, with an ungelatinized starch acid-ester of a substituted dicarboxylic acid whereby the decomposition rate of the L-aspartyl-L-phenylalanine methyl ester when employed in a chewing gum system is reduced.

U.K. Patent Application Serial No. GB 2,177,587 A, discloses a chewing gum product structured in layer form, with all of the water sensitive components of the formulation being placed in a core layer and encased in outer layers of water insensitive materials. It is also disclosed that one or more flavorants may be used in the gum base employed as the shell layers, and that the core material may contain one or more flavorings.

On the other hand, the chewing gum product of the present invention includes a coextruded or colayered gum including at least two separate portions wherein Aspartame is disposed in a portion separate and apart from those components which would degrade it, such as aldehyde-based flavorants, moisture components and other substances which would result in a pH of above about 4.5, an environment in which Aspartame is unstable.

SUMMARY OF THE INVENTION

The stabilized chewing gum product of this invention includes a first portion chewing gum composition comprising a gum base and an L-aspartic acid derived sweetener, and at least a second portion chewing gum composition comprising a gum base, at least one flavoring agent and, optionally, a moisture-containing component so that the L-aspartic acid derived sweetener of the first portion is present in the gum product substantially out of contact with the flavoring agents and moisture containing component of the second portion. In a particularly preferred embodiment, one or more organic acids are present in the portion containing the L-aspartic acid derived sweetener. The presence of the organic acid provides a pH range which increases and enhances the stability of the L-aspartic acid derived sweetener. The portions can be layers of gum composition or other distinct gum portions which maintain integrity in the gum product. The arrangement of the chewing gum product of the present invention increases the stability of the L-aspartic acid derived sweeteners.

The method of forming the stabilized chewing gum product of this invention includes providing a first portion including a gum base, an L-aspartic acid derived sweetener, and optionally, but preferably, one or more organic acids, in the absence of added aldehyde-based flavoring and moisture agents, providing at least one second portion including a gum base, flavorings and, optionally, at least one moisture-containing agent, and applying the first portion to the second portion in surface-to-surface relationship to form the stabilized gum product, whereby the L-aspartic acid derived sweetener(s) in the product is stabilized by preventing mutual contact between the L-aspartic acid derived sweetener(s) of the first portion and the flavorings and optional moisture component of the second portion, and is stabilized by the presence of the organic acids in the first portion.

The chewing gum product of the present invention exhibits a variety of advantages resulting from the improved manner in which the L-aspartic acid derived sweeteners are stabilized.

For instance, additional amounts of L-aspartyl-L-phenylalanine methyl ester (APM) are not required to be added when formulating the gum product in order to compensate for destabilization of APM so that when the gum product is being consumed, the desired concentration of APM will be available in the gum composition.

Additionally, the present gum product can include a normal and/or high moisture content without undergoing APM destabilization. Similarly, the present gum product can include aldehyde-based flavorings without suffering from the concomitant destabilization of APM.

Furthermore, the present gum product is organoleptically satisfying to the consumer, since immediate sweetness can be provided as well as sustained sweetness when, for example, encapsulated sweeteners are used in addition.

DESCRIPTION OF THE DRAWINGS

FIG. 1 is a perspective view of the present gum product in stick form;

FIG. 2 is a perspective view of the present gum product in chunk form;

FIG. 3 is a perspective view of the present gum product in chunk form having four separate portions;

FIG. 4 is a perspective view of the present gum product in tubular form having four separate portions; and FIG. 5 is a perspective view of the present gum product in chunk form having four separate portions.

DETAILED DESCRIPTION OF THE PREFERRED EMBODIMENT

Description of the Portion Containing the L-Aspartic Acid Derived Sweetener

Preferably, the chewing gum composition of the first portion, i.e., the sweetener containing portion, as well as the chewing gum composition of the second portion, is substantially anhydrous. By substantially anhydrous, it is meant that there is less than about 2% by weight of moisture in the portion. Suitable chewing gum compositions having a relatively low moisture content are described in U.S. Pat. Nos. 4,514,422 to Yang et al., issued Apr. 20, 1985; 4,579,738 to Cherukuri et al., issued Apr. 1, 1986; 4,581,234 to Cherukuri et al., issued Apr. 8, 1986; and 4,587,125 to Cherukuri et al., issued May 6, 1986; the disclosures of each being incorporated herein by reference.

The gum base used may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadene-styrene copolymers, isobutylene-isoprene copolymers, polyethylene, polyisobutylene and polyvinylacetate and mixtures thereof, are particularly useful.

The gum base can contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood or gum rosin, pentaerythritol ester of wood or gum rosin, glycerol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin and partially hydrogenated methyl ester of rosin, such as polymers of alpha-pinene or beta-pinene; terpene resins including polyterpene and mixtures thereof. The elastomer solvent may be employed in an amount ranging from about 10% to about 75% and preferably about 45% to about 70% by weight of the gum base.

A variety of traditional ingredients may be incorporated in the gum base, such as plasticizers or softeners. Examples of these ingredients include lanolin, stearic acid, sodium stearate, potassium stearate, glyceryl triacetate, glycerine, lecithin, glyceryl monostearate and the like. Natural waxes, petroleum waxes, polyurethane waxes, paraffin waxes and microcrystalline waxes may also be incorporated into the gum base to obtain a variety of desirable textures and consistency properties. Mixtures of these traditional ingredients are also contemplated. These traditional ingredients are generally employed in amounts of up to about 30% by weight, and preferably, in amounts of from about 3% to about 20% by weight of the final chewing gum product.

The sweetener containing portion of the present chewing gum product may additionally include the conventional additives of coloring agents such as titanium dioxide; emulsifiers such as lecithin and glyceryl monostearate; and additional fillers such as aluminum hydroxide, alumina, aluminum silicates, calcium carbonate, dicalcium phosphate, and talc and combinations thereof. These fillers may also be used in the gum base in various amounts. Usually, when present, these fillers are used in amounts up to about 30% by weight of said gum product. Preferably, the amount of fillers when used will vary from about 4% to about 30% by weight of the final chewing gum product.

The gum base used in the sweetener containing portion may be employed in quantities from about 5% to about 50%, preferably from 15% to about 40% and, most preferably, from about 20% to about 30% by weight of the final chewing gum product.

The sweetener containing portion of the present chewing gum product contains an L-aspartic acid derived sweetener in an amount effective to provide the level of sweetness desired. The preferred embodiment includes L-aspartyl-L- phenylalanine methyl ester (APM) as a sweetener, the preparation of which is set forth in U.S. Pat. No. 3,492,121, incorporated herein by reference. Other examples of L-aspartic acid derived sweeteners include L-α-aspartyl-N-(2,2,4,4-tetramethyl-3-thiethanyl)-D-alaninamide hydrate; methyl esters of L-aspartyl-L-phenylglycine and L-aspartyl-L-2,S,dihydrophenylglycine; L-aspartyl-2,5-dihydro-L-phenylalanine; L-aspartyl-L-(1-cyclohexy-en)alanine; and the like.

The problem with APM is that APM displays sensitivity when it is exposed to elevated temperatures, moisture, certain pH conditions and certain other food ingredients, including flavorings, especially aldehyde-based flavorings. Such exposure causes APM to break down to the corresponding diketopiperazine (DKP), which is evidenced by a proportionate decrease in sweetness.

APM, or other L-aspartic acid derived sweetener, can be employed in the sweetener-containing gum composition as a free sweetener whether used alone or in combination with other sweeteners and/or encapsulated APM. Free APM, or other L-aspartic acid derived sweetener, may be used in amounts of about 0.01% to about 2.0% by weight of the final chewing gum product. Preferably, APM is employed in an amount of about 0.01% to about 1.0% and, most preferably, in an amount of about 0.01% to about 0.4% of the final chewing gum product. Auxiliary sweeteners may be used to complement APM and may be employed in conventional amounts based on the total weight of the chewing gum product, as is standard in the art. For instance, a preparation of APM-containing sweeteners are disclosed in U.S. Pat. No. 4,556,565 to Arima et al. However, the present invention is distinguished from the disclosure of U.S. Pat. No. 4,556,565 which describes an APM-containing gum composition wherein an attempt to stabilize the APM is undertaken by replacing calcium carbonate with microcrystalline cellulose powder.

Optionally, other sweetening agents (sweeteners) can be used in conjunction with the APM or other L-aspartic acid derived sweeteners in amounts sufficient to complement the sweetness of the APM or other L-aspartic acid derived sweeteners. It is also contemplated that these other sweeteners may be used in amounts sufficient to provide a desired level of sweetness in which the level of sweetness is enhanced by the amount of APM or other L-aspartic acid derived sweeteners used. These other sweeteners include water-soluble sweetening agents, water-soluble artificial sweeteners, water-soluble sweetening agents derived from naturally occurring water-soluble sweeteners, protein based sweeteners, mixtures thereof, and the like. Without being limited to particular sweeteners, representative illustrations of these other sweeteners include:

A. Water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, glycyrrhizin, and sugar alcohols such as sorbital, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, acesulfame-K and the like, and the free acid form of saccharin;

C. Water-soluble sweeteners derived from naturally occurring water-soluble sweeteners, such as a chlorinated derivative of ordinary sugar (sucrose), known, for example, under the product designation of sucralose; and D. Protein based sweeteners such as thaumatin.

These other sweeteners, when used, are used in amounts effective to provide the desired end result and such amounts may vary with the sweetener selected.

For example, for an easily extractable sweetener the amounts can range from about 0.01% to about 90% by weight of the final chewing gum product. The water-soluble sweeteners described in category A above can be used in amounts up to about 75% by weight of the final chewing gum product with about 25% to about 75% by weight being suitable. Some of the sweeteners in category A (e.g., glycyrrhizin) may be used in amounts set forth for categories B-D above due to the sweeteners known sweetening ability. The sweeteners in categories B-D can be used in amounts of about 0.005% to about 5.0% and preferably about 0.05% to abut 2.5% by weight of the final chewing gum product. The amounts selected for use in conjunction with the L-aspartic acid derived sweeteners are those which will provide a desired level of sweetness independent from the flavor level achieved from the flavorings used.

The sweetener containing portion of the present chewing gum product can also contain an encapsulated APM sweetener. APM may be encapsulated by a variety of coating techniques, including spray drying, coascervation, and the like. Preferably, the APM is encapsulated by a method that operates in similar fashion to fluidized bed coating processes, in that particles of APM are suspended in an apparatus that creates a strong upward air current or stream in which the particles move. The stream passes through a zone of finely atomized droplets of the coating material or encapsulant, after which the thus coated particles pass out of the upward stream and pass downward in a fluidized condition countercurrent to a flow of heated fluidized gas whereupon they are aired, and may reenter the upward-moving coating zone for a subsequent discrete coating application. The foregoing method and associated apparatus are known as the Wurster Process. The Wurster Process and its associated apparatus are set forth in detail in the following U.S. Pat. Nos.: 3,089,824,; 3,117,027, 3,196,827; 3,241,520; and 3,253,944.

The L-aspartic acid derived sweetener containing portion of the present chewing gum product also preferably contains one or more organic acids in amounts which will maintain the pH of this portion in a range of up to about 4.0 and, preferably, between a range of about 2.5 to about 3.5. The amount and type of organic acid to be employed is determined in any conventional manner, so that the pH is maintained within the desired ranges. As merely illustrative, these acids can include, but should not be limited to, malic acid, adipic acid, citric acid, tartaric acid, fumaric acid, ascorbic acid, and the like. By separating and concentrating the acids solely in the sweetener containing portion concentrations of acid can be used which will provide a stable pH environment for the L-aspartic acid derived sweetener and still yield a gum composition having low enough tartness to be palatable to the chewer. Thus, for example, organic acids used in a total amount of up to about 4% by weight of the total sweetener containing portion may prove useful with up to about 3% by weight being preferred. Usually, the amount of acid utilized is within the range of about 0.05% to about 3% by weight of the total sweetener containing portion.

Description of the Portion that is devoid of the L-Aspartic Acid Derived Sweetener This particular portion of the present chewing gum product also includes a gum base. The preceding description regarding the gum base employed in the portion containing the L-aspartic acid derived sweetener applies equally as well herein.

Thus, in brief reiteration, the gum base is primarily fabricated from the suitable polymers described. Additionally, as previously described, the gum base can contain elastomer solvents, plasticizers, softeners, coloring agents, emulsifiers and fillers.

This particular portion of the present chewing gum product also includes flavoring components.

The flavorings employed in this portion include those known to the skilled artisan, such as, natural and artificial flavors. These flavorings may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot and so forth. These flavorings may be used individually or in admixture. Commonly used flavors include mints such as peppermint, menthol, artificial vanilla, cinnamon derivatives, and various fruit flavors, whether employed individually or in admixture. The flavorings are generally utilized in amounts that will vary depending upon the individual flavor, and may, for example, range in amounts of about 0.005% to about 5% by weight of the final chewing gum compositions weight and preferably about 0.2% to about 3% by weight and most preferably about 0.4% to about 2.5% by weight.

Separation of the L-aspartic acid derived sweetener into one portion and the flavorings into another portion, as stated above, results in improved stability of the L-aspartic acid derived sweetener. The improved stability is more significantly enhanced when organic acids are added to the L-aspartic acid derived sweetener portion, and such stability is more dramatically demonstrated when the flavorings (flavors) are aldehyde-based flavorings.

Examples of suitable aldehyde flavors include, but are not limited to: acetaldehyde (apple); benzaldehyde (cherry, almond); anisic aldehyde (licorice, anise); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese) valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., Melonal (melon); 2,6-dimethyloctanal (green fruit); and, 2-dodecenal (citrus, mandarin); cherry; grape; strawberry shortcake; mixtures thereof; and the like.

When used, the moisture-containing component is used in amounts effective to provide the desired end result, and preferably is used in amounts such that an anhydrous chewing gum composition portion is obtained. The moisture-containing component is a material naturally containing water or a material in which water is added into the material. Examples of moisture-containing components include but are not limited to: water; hydrogenated starch hydrolysate; solutions of the other sweeteners described above; gum arabic solutions; and the like. In general, for anhydrous portions, the moisture-containing components may be used in amounts up to about 1% by weight of the final chewing gum product with a suitable range being about 0.01% to about 1% by weight. If an anhydrous portion is not contemplated then the moisture-containing component may be used in amounts up to about 20% by weight of the final chewing gum product, unless one of the other sweeteners described above and known to those skilled in the art as a high intensity sweetener (e.g., saccharin, cyclamate, acesulfame-K; glycyrrhizin, monellin, chlorinated derivative of sucrose, thaumatin, and the like) is used, in which case amounts up to about 3% by weight of the final chewing gum product may prove suitable.

Preparation of the Chewing Gum Product

The present chewing gum product is prepared by first separately preparing each of the portions described above. It is to be understood that while only two separate portions have been described, that is, the portion which contains the L-aspartic acid derived sweetener and the portion which is devoid of same, the present chewing gum product must contain both of these portions at a minimum. Other portions can be included in the final gum product. Each additional portion, however, will, of course, correspond in composition to either the portion containing the L-aspartic acid derived sweetener or the portion that is devoid of same.

After each of the respective portions have been separately prepared, in a manner which will be further understood by referring to the examples discussed hereinafter, the portions are mutually applied to each other, that is, they are colayered or coextruded in a surface-to-surface relationship.

Referring now to the drawings, illustrated in FIGS. 1 to 5 are various embodiments of the present chewing gum product. Each of the shaded portions represent the portion containing the L-aspartic acid derived sweetener, while the unshaded portion represents the portion devoid of the sweetener.

The following examples serve to provide further appreciation of the invention but are not meant in any way to restrict the effective scope of the invention.

Thus, while the preceding description and the following examples focus on a bi-layered gum composition, it is to be understood that the present invention also pertains to a gum product having more than two portions which can take the form of layers or other configurations such as square or round shaped tubes, etc.

In the examples that follow substantially anhydrous chewing gum compositions were used.

EXAMPLES 1-6

The following procedure was used to form the chewing gum compositions of the examples using the formulations given in Table I.

The gum base was heated to a temperature in excess of 60° C. to reduce it to its molten state. The molten gum base was added to a standard gum mixing vessel. The gum base was reversed mixed as cold water was applied to the kettle while heating and mixing were continued. Before the gum base had achieved a temperature of 80° C., lecithin and a softener were added to the kettle and the admixture was reverse mixed for about 3 minutes. At a temperature maintained between 40°-75° C. two-thirds of the total amount of sorbitol, organic acids, which included malic acid, adipic acid and citric acid, mannitol and color, were added and forward mixed for 3 minutes. At a temperature maintained between 40°-70° C. another softener was added and forward mixed for 3 minutes, reversed mixed for 30 seconds, and then forward mixed for 30 seconds. At a temperature maintained between 30°-65° C., yet another softener was added and the admixture was forward mixed for about 2 minutes. At a temperature maintained between 30°-65° the remaining one-third of the total amount of sorbitol and still another softener were added, and the admixture was forward mixed for 4 minutes. At a temperature below the degradation temperature of encapsulated APM, encapsulated APM and the free APM were added to the designated examples, and the admixture was forward mixed for 3 minutes.

The aforedescribed procedure was employed to produce both portions. Both of the resulting admixtures for each example were removed from the vessel and placed into separate extruder chambers of a coextruder, and coextruded into a single slab which had limited surface-to-surface contact between formulas. The slab was cut and wrapped into pieces.

Table I below illustrates the percentage, by weight, of each ingredient used in each portion of the gums formed in Examples 1-6.

TABLE I

| Example | 1 | | 2* | | 3 | | 4* | | 5 | | 6* | |
|---|---|---|---|---|---|---|---|---|---|---|---|---|
| Flavor | Cherry/Grape | | | | Regular** | | | | Strawberry Shortcake | | | |
| Layers | A | B | A | B | A | B | A | B | A | B | A | B |
| Ingredients | | | | | | | | | | | | |
| Gum Base | 25.00 | 25.00 | 25.00 | 25.00 | 22.00 | 22.00 | 25.00 | 19.00 | 23.00 | 23.00 | 24.00 | 22.00 |
| Lecithin | 1.00 | 1.00 | 1.00 | 1.00 | 0.80 | 0.80 | 0.50 | 1.10 | 1.00 | 1.00 | 1.00 | 1.00 |
| Malic Acid | 0.35 | 0.35 | — | 0.70 | — | — | — | — | 0.30 | 0.30 | 0.60 | — |
| Adipic Acid | 0.35 | 0.35 | — | 0.70 | — | — | — | — | 0.30 | 0.30 | 0.60 | — |
| Citric Acid | 0.30 | 0.30 | — | 0.60 | 0.50 | 0.50 | — | 1.00 | 0.25 | 0.25 | 0.50 | — |
| Red Color | 0.40 | 0.40 | 0.40 | 0.40 | 0.02 | 0.07 | 0.02 | 0.07 | — | 0.10 | — | 0.10 |
| Softeners | 10.25 | 10.25 | 9.25 | 11.25 | 10.7 | 10.7 | 9.6 | 11.8 | 10.6 | 10.6 | 10.8 | 10.4 |
| Mannitol | 15.00 | 15.00 | 15.00 | 15.00 | 15.00 | 15.00 | 15.00 | 15.00 | 15.00 | 15.00 | 15.00 | 15.00 |
| Cherry/Grape Flvr. | 0.90 | 0.90 | 1.80 | — | — | — | — | — | — | — | — | — |
| Strawberry Shortcake Flavor | — | — | — | — | — | — | — | — | 0.70 | 0.70 | — | 1.40 |
| Regular Flavor | — | — | — | — | 1.30 | 1.30 | 2.60 | — | — | — | — | — |
| Encapsulated APM | 1.66 | 1.66 | — | 3.32 | 1.66 | 1.66 | — | 3.32 | 1.66 | 1.66 | 3.32 | — |
| Free APM | 0.05 | 0.05 | — | 0.10 | 0.05 | 0.05 | — | 0.10 | 0.05 | 0.05 | 0.10 | — |

TABLE I-continued

| Example | 1 | | 2* | | 3 | | 4* | | 5 | | 6* | |
|---|---|---|---|---|---|---|---|---|---|---|---|---|
| Flavor | Cherry/Grape | | | | Regular** | | | | Strawberry Shortcake | | | |
| Layers | A | B | A | B | A | B | A | B | A | B | A | B |
| Sorbitol | 44.74 | 44.74 | 47.55 | 41.93 | 47.97 | 47.92 | 47.28 | 48.61 | 47.14 | 47.04 | 44.08 | 50.18 |

*Compositions of this invention
**A bubble gum type flavor

Compositions of this invention are represented by Examples 2, 4 and 6 in which the APM and the organic acids are in one portion and the flavor is in another portion. A and B, represent the portions of each composition. In the controls, Examples 1, 3 and 5, the APM and organic acids are not separated into one portion distinct from the flavoring.

Table II below illustrates the improved stability of Aspartame when employed in the gum products of this invention, i.e., Examples 2, 4 and 6, relative to the gum products obtained in control Examples 1, 3 and 5.

the flavorings used in Examples 1 and 2 and in Examples 5 and 6.

Those skilled in the art will appreciate that, unless indicated otherwise, all percents herein are percent by weight of the final chewing gum composition (product). Also, the total amount of all ingredients (components) used in the chewing gum compositions of this invention equals 100%.

Thus, while there have been described what are presently believed to be the preferred embodiments of the invention, those skilled in the art will realize that

TABLE II

| Storage Cond. | Example 1 | | Example 2 | | Example 3 | | Example 4 | | Example 5 | | Example 6 | |
|---|---|---|---|---|---|---|---|---|---|---|---|---|
| 25° C. | | | | | | | | | | | | |
| Initial | 0.305 | — | 0.29 | — | 0.27 | — | 0.29 | — | 0.30 | — | 0.315 | — |
| 8 weeks | 0.270 | 88.5 | 0.258 | 89.0 | 0.244 | 90.4 | 0.264 | 91.0 | 0.254 | 84.7 | 0.277 | 87.9 |
| 30° C. | | | | | | | | | | | | |
| 1 week | 0.28 | 91.8 | 0.32 | 110* | 0.265 | 98.2 | 0.295 | 102* | 0.28 | 93.3 | 0.30 | 95.2 |
| 2 weeks | 0.274 | 89.8 | 0.304 | 105* | 0.242 | 89.6 | 0.288 | 99.3 | 0.272 | 90.7 | 0.290 | 92.1 |
| 4 weeks | 0.275 | 90.2 | 0.278 | 95.9 | 0.244 | 90.4 | 0.272 | 93.8 | 0.264 | 88.0 | 0.289 | 91.8 |
| 8 weeks | 0.242 | 79.3 | 0.248 | 85.5 | 0.206 | 76.3 | 0.280 | 96.6 | 0.223 | 74.3 | 0.245 | 77.8 |
| 37° C. | | | | | | | | | | | | |
| 1 week | 0.260 | 85.2 | 0.276 | 95.2 | 0.236 | 87.4 | 0.283 | 97.6 | 0.282 | 94.0 | 0.284 | 90.2 |
| 2 weeks | 0.252 | 82.6 | — | — | 0.221 | 81.8 | — | — | 0.254 | 84.6 | 0.294 | 93.3 |
| 4 weeks | 0.234 | 76.7 | 0.238 | 82.1 | 0.202 | 74.8 | 0.216 | 74.5 | 0.236 | 78.7 | 0.260 | 82.5 |

*Appear to represent anomalous results

The numbers appearing in the left-hand columns represent the free APM remaining expressed as a percent of the total gum composition. The numbers appearing in the right-hand columns represent the free APM remaining expressed as a percent of the initial amount of APM utilized after a variety of time periods and temperature have elapsed.

As these data demonstrate, the chewing gum product of examples 2, 4 and 6 show improved Aspartame stability over the gum product of Examples 1, 3 and 5.

Table III below further demonstrates the improved stability of free Aspartame of the inventive gum products resulting from Examples 2, 4 and 6, relative to the gum products of Examples 1, 3 and 5.

Table III demonstrates Aspartame stability from 25° C. in a 52 week regression line (arrhenius treatment).

changes and modifications may be made thereto without departing from the spirit of the invention, and it is intended to claim all such changes and modifications as fall within the true scope of the invention.

What is claimed is:

1. A stabilized chewing gum product containing an L-aspartic acid derived sweetener which comprises:
    a first portion chewing gum composition comprising about 5% to about 50% weight of the final chewing gum product of a gum base and about 0.01% to about 2.0% by weight of the final chewing gum product of an L-aspartic acid derived sweetener in free form, wherein there is an absence of aldehyde-based flavoring in said first portion and the pH is not above 4.5; and
    at least a second portion chewing gum composition

TABLE III

| Aspartame | Example 1 | Example 2 | Example 3 | Example 4 | Example 5 | Example 6 |
|---|---|---|---|---|---|---|
| log % Retained | 1.627 | 1.740 | 1.725 | 1.736 | 1.435 | 1.627 |
| % Retained (52 weeks) | 42 | 55 | 53 | 54 | 27 | 42 |
| % Retained (39 weeks) | 52 | 64 | 62 | 63 | 38 | 52 |
| % Retained (26 weeks) | 65 | 74 | 73 | 74 | 52 | 65 |

These data further demonstrate the improved stability of the free Aspartame in the present gum product.

The results of Example 2 in comparison to Example 1, and of Example 6 in comparison to Example 5, appear to be significantly greater than the results of Example 4 in comparison to Example 3. These results may be explained in that it is believed that the flavoring used in Examples 3 and 4 contains less aldehyde groups than comprising about 5% to about 50% by weight of the final chewing gum product of a gum base, and at least one flavoring agent wherein the flavorings are in amounts of about 0.005% to about 5% by weight of the final chewing gum composition;
said first and second portion being formed into said product in a surface-to-surface relationship whereby said L-aspartic acid derived sweetener of said first portion substantially out of contact with the flavoring agent of said second portion, thereby increasing the stability of said L-aspartic acid derived sweetener in such chewing gum product.

2. The chewing gum product of claim 1 wherein said L-aspartic acid derived sweetener is APM.

3. The chewing gum product of claim 1 wherein said first portion further includes at least one organic acid.

4. The chewing gum product of claim 3 wherein said organic acid maintains the pH of said first portion at not more than about 4.0.

5. The chewing gum product of claim 3 wherein said organic acid maintains the pH of said first portion between a level of about 2.5 to about 3.5.

6. The chewing gum product of claim 3 wherein said organic acid is selected from the group consisting of malic acid, adipic acid, tartaric acid, fumaric acid, ascorbic acid and citric acid.

7. The chewing gum product of claim 1 wherein said chewing gum composition of said first portion is an anhydrous chewing gum composition.

8. The chewing gum product of claim 1 wherein said gum base includes an elastomer selected from the group consisting of chicle, jelutong, gutta percha, crown gum, butadiene-styrene copolymers, isobutylene-isoprene copolymers, polyethylene, polyisobutylene, polyvinyl acetate and mixtures thereof.

9. The chewing gum product of claim 1 wherein said gum base includes one or more elastomer solvents.

10. The chewing gum product of claim 9 wherein said one or more elastomer solvents are employed in an amount from about 10% to about 75% by weight of said gum base.

11. The chewing gum product of claim 9 wherein said one or more elastomer solvents are employed in an amount from about 45% to about 70% by weight of said gum base.

12. The chewing gum product of claim 1 wherein said second portion additionally contains a moisture-containing agent selected from the group consisting of water, hydrogenated starch hydrolysate, solutions of sweeteners and gum arabic solutions.

13. The chewing gum product of claim 1 wherein said gum base is employed in said first portion and in said at least one second portion in an amount from about 15% to about 40% by weight of the final chewing gum product.

14. The chewing gum product of claim 12 wherein said moisture-containing agent used in amounts up to about 1% by weight of the final chewing gum product.

15. The chewing gum product of claim 1 wherein said L-aspartic acid derived sweetener is employed in said first portion in an amount from about 0.1% to about 1.0% by weight of said chewing gum product.

16. The chewing gum product of claim 1 wherein said L-aspartic acid derived sweetener is employed in said first portion in an amount from about 0.01% to about 0.4% by weight of said chewing gum product.

17. The chewing gum product of claim 1 wherein said first portion includes auxiliary sweeteners used to complement the L-aspartic acid derived sweetener.

18. The chewing gum product of claim 2 wherein said APM is encapsulated.

19. The chewing gum product of claim 17 wherein said auxiliary sweeteners are encapsulated.

20. The chewing gum product of claim 17 wherein said auxiliary sweeteners are selected from the group consisting of mannitol, sorbitol, xylitol, saccharin, cyclamate, dihydrochalcone, glycyrrhizin, stevioside, hydrogenated starch hydrolysate, acesulfame-K, monellin, L-α-aspartyl-N-(2,2,4,4-tetramethyl-3-diethanyl)-D-alaninamide hydrate, a chlorinated derivative of sucrose, and mixtures thereof.

21. The chewing gum product of claim 1 wherein said L-aspartic acid derived sweetener is prepared under substantially anhydrous conditions.

22. The chewing gum product of claim 1 wherein said flavorings are selected from the group consisting of peppermint, menthol, artificial vanilla, cinnamon derivatives, various fruit flavors and admixtures thereof.

23. The chewing gum product of claim 1 wherein said flavorings in said second portion are aldehyde-based flavorings.

24. The chewing gum product of claim 23 wherein said aldehyde-based flavorings are selected from the group consisting of acetaldehyde, benzaldehyde, anisic aldehyde, cinnamic aldehyde, citral, neral, decanal, ethyl vanillin, heliotropine, vanillin, alpha-amyl cinnamaldehyde, butyraldehyde, valeraldehyde, citronellal, decanal, aldehyde C-8, aldehyde C-9, aldehyde C-12, 2-ethyl butyraldehyde, hexenal, tolyl aldehyde, veratraldehyde, 2,6-dimethyl5-heptenal, 2,6-dimethyloctanal, 2-dodecenal, cherry, grape, strawberry shortcake, and mixtures thereof.

25. The chewing gum product of claim 1 wherein said first portion additionally contains one or more organic acids in amounts to maintain the pH of said first portion in a range of up to about 4.0, and wherein said flavoring in said second portion are aldehyde-based flavorings.

26. The chewing gum product of claim 1 wherein said flavorings are included in said at least one second portion in an amount from about 0.4% to about 2.5% by weight of said chewing gum product.

27. The chewing gum product of claim 1 further comprising additional incorporated materials selected from the group consisting of fillers, emulsifiers, coloring agents, plasticizers, softeners, waxes, bulking agents and mixtures thereof.

28. The chewing gum product of claim 27 wherein said additional incorporated materials are employed in amounts up to about 30% by weight of said gum product.

29. The chewing gum product of claim 1 wherein said optionally included moisture component is employed in an amount in excess of 1% to about 10% by weight of said gum product.

30. The chewing gum product of claim 1 which further comprises more than two layers.

31. The chewing gum product of claim 25 wherein the L-aspartic acid derived sweetener is APM.

32. The chewing gum product of claim 31 wherein the aldehyde-based flavorings are selected from the group consisting of acetaldehyde, benzaldehyde, anisic aldehyde cinnamic aldehyde, citral, neral, decanal, ethyl vanillin, heliotropine, vanillin, alpha-amyl cinnamaldehyde, butyraldehyde, valeraldehyde, citronellal, decanal, aldehyde C-8, aldehyde C-9, aldehyde C-12, 2-ethyl butyraldehyde, hexenal, tolyl aldehyde, venatraldehyde, 2,6-dimethyl-5-heptenal, 2,6-dimethyloctanal, 2-dodecenal, cherry, grape, strawberry shortcake, and mixtures thereof.

33. The chewing gum product of claim 31 wherein the organic acid is selcted from the group consisting of malic acid, adipic acid, tartaric acid, fumaric acid, ascorbic acid, and citric acid.

34. The chewing gum product of claim 33 wherein the chewing gum composition of the first portion is an anhydrous chewing gum composition.

35. A method of forming a stabilized chewing gum product having an L-aspartic acid derived sweetener in free form which comprises:

providing a first portion chewing gum composition comprising about 5% to about 50% by weight of the final chewing gum product of a gum base and about 0.01% to about 2.0% by weight of the final chewing gum product of an L-aspartic acid derived sweetener in free form, wherein there is an absence of aldehyde-based flavoring in said first portion and the pH is not above 4.5;

providing at least one second portion chewing gum composition about 5% to about 50% by weight of the final chewing gum product of a gum base and flavorings wherein the flavorings are in amounts of about 0.005% to about 5% by weight of the final chewing gum composition and applying said first portion to said at least one second portion in surface-to-surface relationship to form said stabilized gum product, whereby the stability of said free L-aspartic acid derived sweetener is substantially improved by preventing mutual contact between said L-aspartic acid derived sweetener of said first portion and said flavorings of said seoond portion.

36. The method of claim 35 wherein said applying of said first portion to said at least second portion comprises coextruding said portions in said surface-to-surface relationship to form said gum product.

37. The method of claim 35 wherein said second portion additionally contains a moisture-containing agent selected from the group consisting of water hydrogenated starch hydrolysate, solutions of sweeteners and gum arabic solutions.

* * * * *